July 15, 1924.

C. H. WRIGHT 1,501,386

GRASS DIVIDER FOR MOWERS

Filed July 25, 1922

Inventor
Coral H. Wright

By Lancaster and Allwine

Attorneys

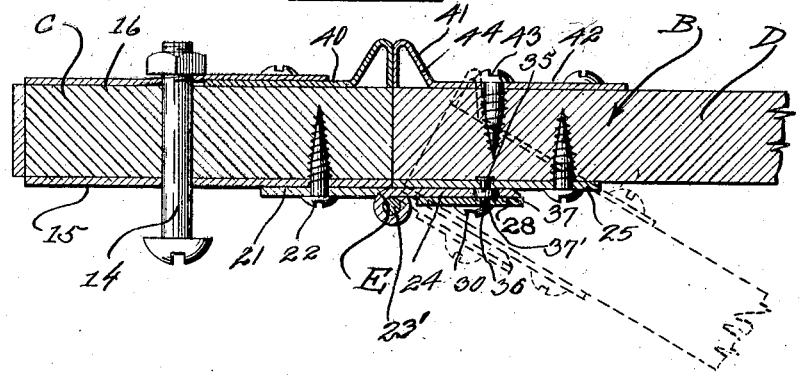

Patented July 15, 1924.

1,501,386

UNITED STATES PATENT OFFICE.

CORAL H. WRIGHT, OF JOSEPH, IDAHO.

GRASS DIVIDER FOR MOWERS.

Application filed July 25, 1922. Serial No. 577,372.

*To all whom it may concern:*

Be it known that I, CORAL H. WRIGHT, a citizen of the United States, residing at Joseph, in the county of Idaho and State of Idaho, have invented certain new and useful Improvements in Grass Dividers for Mowers, of which the following is a specification.

This invention relates to mowing machines, and the primary object of the invention is to provide a novel grass divider, which will fold when undue stress is placed thereon thereby eliminating the breaking of the grass divider.

In turning corners with ordinary mowing machines, the grass divider often catches in a clump of stubble or against a rock or the like, subjecting the divider to undue strain, which often causes the breaking of the divider. This of course results not only in the necessity of the replacing of the grass divider, but also results in the loss of time during the obtaining and the replacing of the divider.

It is therefore another prime object of this invention to provide an improved grass divider or mowing machine embodying a section hingedly connected to the outer supporting shoe, the section being free to swing inwardly toward the cutter bar when subjected to undue stress, means also being provided for permitting the hinged section to be pulled off of the mower when stresses tend to pull the same outwardly away from the cutter bar which would tend to break the grass divider.

A further object of the invention is to provide an improved means for connecting the outer section of the grass divider to the inner section or supporting shoe of the cutter bar, said means permitting the free swinging movement of the grass divider inwardly toward the cutter bar when subjected to undue strains during the turning of the mower and permitting the divider to be pulled off of the inner section or supporting shoe when the divider is subjected to pressure tending to push the same outwardly.

A still further object of the invention is to provide an improved grass divider for mowing machines of the above character, which will be durable and efficient in use, one that is simple and easy to manufacture, and one which can be placed upon an ordinary mowing machine with a minimum amount of time and cost.

With these and other objects in view, the invention consists in the novel construction, arrangement and formation of parts, as will be hereinafter more specifically described, claimed and illustrated in the accompanying drawings, forming a part of this specification, in which drawings:

Figure 4 is an enlarged fragmentary horizontal longitudinal section through the divider taken on the line 4—4 of Figure 2, showing the normal position of the divider section, the folded position of the outer section being shown in dotted lines.

Figure 5 is a similar view showing how the outer section is permitted to be pulled off of the inner section when the grass divider is subjected to undue strain coming from the inside of the mower.

Figure 6 is a detail vertical transverse section taken on the line 6—6 of Figure 2.

Figure 7 is an inner side elevation of the improved grass divider showing the outer section in perspective and being pulled off of the inner section by forces coming from the inner face thereof.

Figure 8 is a detail perspective view of one of the retaining plates carried by the outer section of the grass divider for receiving one of the leaves carried by the hinge of the inner section.

Figure 1:
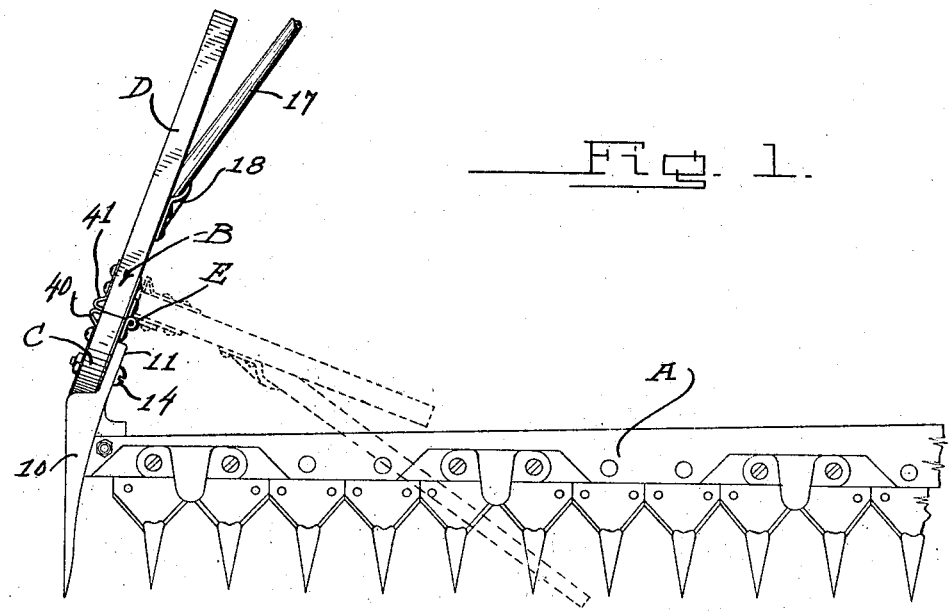
Figure 1 is a fragmentary plan view of the outer end of a cutter bar, showing my improved folding grass divider connected therewith, the folded position of the divider being shown in dotted lines.
Figure 2:
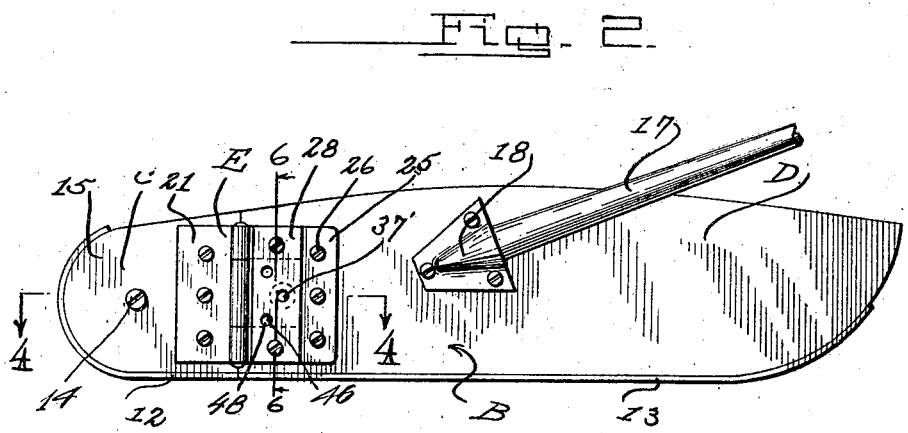
Figure 2 is an inner side elevation of the improved divider bar showing the novel type of hinge carried by the inner and outer sections.
Figure 3:
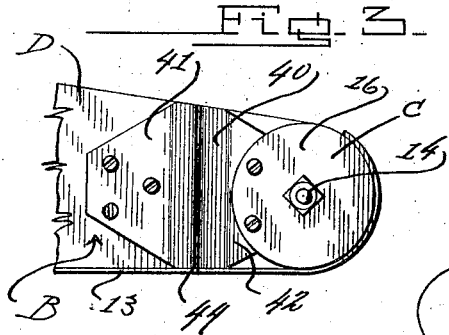
Figure 3 is a fragmentary outer side elevation of the improved grass divider, showing the abutment members carried by the outer face of the grass divider.

Referring to the drawings in detail, wherein similar reference characters designate corresponding parts throughout the several views, the letter A indicates the cutter bar of the mowing machine of the ordinary type; and B, the improved grass divider therefor. The cutter bar A is of the usual or any preferred construction, and the outer end thereof carries the ordinary type of supporting shoe 10; the rear end of which is provided with the inwardly inclined attaching lug 11, to which the grass divider B is secured.

The grass divider B performs the same functions as the ordinary grass divider, and as hereinbefore stated in the objects of the invention, the grass divider simply contemplates means for presenting the breakage thereof during the turning of corners by the mower.

This improved grass divider B includes an inner relatively small attaching section C and the relatively long grass dividing section D.

The sections C and D when placed together are shaped exactly the same as an ordinary grass divider, and therefore a detailed description of the configuration thereof is deemed unnecessary. However, the lower active faces of these sections C and D are provided with wear runners 12 and 13.

The inner section is secured by means of a removable bolt 14 to the attaching lug 11, and if so desired a suitable metal wear plate 15 can be carried by the inner face of the section C for engaging said attaching lug 11. The outer face of the said section C can also be provided with a similar wear plate 16 if found desirable.

As hereinbefore noted, the outer section D forms the main guiding portion of the grass divider, and the same carries the usual inclined guide stick 17, a socket 18 being provided therefor.

The sections C and D are detachably and hingedly connected by means of the novel joint E which forms the most important feature of my invention.

This joint E comprises a hinge 20, which includes a relatively long leaf 21 which can be secured to the attaching section C by means of suitable fastening elements 22. The outer edge of the leaf 21 is provided with suitable barrels which align with the hinge barrel 23 carried by the relatively small leaf 24, adapted to detachably engage and support the outer section D. A pin 23' is passed through the barrels to pivotally connect the leaves 21 and 24.

The outer section D carries a face plate 25, which is secured in place by means of suitable fastening elements 26, and this face plate extends from the forward edge of the section D to a point rearwardly thereof. Riveted to the outer face of the face plate 25 are suitable guide lugs 27 and these guide lugs 27 are adapted to support an outer cover plate 28. The lugs 27 and the cover plate 28 define a guide way 29 for receiving the relatively small hinge leaf 24.

The cover plate 28 is supported in a novel manner for a purpose which will be hereinafter more fully described, and as can be readily seen by referring to Figure 6 of the drawings, the cover plate supports inwardly extending bolts 30, which extend through guide openings 31 formed in the guide lugs 27 and the face plate 25, and into pockets 32 formed in the section D. The inner ends of the bolts 30, which extend into the pockets 32 are provided with adjusting nuts 33 and coiled about the bolts are expansion springs 34, the terminals of which engage against the nuts 33 and the inner face of the face plate 25 respectively.

By this construction, it can be seen that the cover plate 28 is resiliently and slidably mounted, and thus when an outward force is exerted thereon, the same will give and move outwardly away from the guide lugs 27 and the face plate 25.

The face plate 25 has riveted or otherwise secured thereto or formed integral therewith an enlargement or holding lug 35. As shown, this lug or enlargement 35 is of a frusto-conical configuration, but it is to be understood that I do not limit myself to this specific shape. The outer face of this enlargement or holding lug 35 is provided with an outwardly extending pin 36 which is adapted to normally rest in an opening 37' formed in the cover plate 28. Now, the hinged leaf 24 is provided with an enlarged opening 37 and when the hinged leaf 24 is placed in the guide way 29, the enlargement 35 is adapted to seat in said recess 37 and thus prevent the accidental displacement of the hinge leaf 24 from out of the guide way. This effectively holds the leaf 24 in place and permits free swinging movement of the outer section D inwardly.

Thus, it can be seen that when the mowing machine is rounding corners or the like, the outer section D is free to swing inwardly by its engagement with stubble, rocks or the like, and this section D can assume the position indicated by dotted lines in Figure 1 of the drawings, and the inclined guide stick 17 can extend all of the way over the cutter bar A of the mowing machine.

The tension of the outer plate 28 is such as to prevent the normal pulling out of the leaf 24 from the guide way 29, but when undue stress is placed upon the section D which is liable to break the section, the plate 28 will give and be forced outwardly and thus permit the withdrawing of the leaf 24 from the guide, and the separation of the said section D from the section C. The outer face of the sections C and D carries companion abutting plates 40 and 41, respectively, and these abutment plates 40 and 41 are of substantially the same construction and each include attaching plates 42, which can be held in position by suitable fastening elements 43, and the fulcrum shoulders 44, the inner meeting faces of which extend flush with the inner edges of the sections C and D. These shoulders 44 form fulcrum points for permitting the swinging outwardly of the section D when undue stress comes on the same from the inner face thereof, as can be clearly seen by referring to Figure 5 of the drawings.

If so desired, the relatively small hinge leaf 24 can be provided with openings 45, which are adapted to register with openings 46 and 47 formed respectively in the face plate 25 and the cover plate 28. These registering openings 45, 46 and 47 can receive frangible pins 48 and these pins are adapted to be sheered when undue stress comes on the outer section D from the inner side thereof, thus permitting the pulling out of the section.

From the foregoing description, it can be seen that an improved grass divider has been provided, in which the breaking thereof by external forces is positively prevented, and which is permitted to swing freely inwardly toward the cutter bar when turning corners, and which is permitted to be pulled and swung outwardly when undue stress is placed thereon from the inner face thereof.

The grass divider of course, assumes the pose or position as shown in full lines in Figure 1 of the drawings by the engagement of the same with the ground and the section D will of course track in rear of the shoe 10.

Changes in details may be made without departing from the spirit or scope of this invention; but,

I claim:

1. The combination with the cutter bar of a mowing machine, of a grass divider therefor including a minor section and a major section, means rigidly connecting the minor section with the outer end of the cutter bar, means hingedly connecting the minor and major sections together for allowing free swinging movement of the major section toward the cutter bar, and means for permitting detachment of the major section from the minor section by a longitudinal sliding movement when undue stress is placed on the major section at the inner face thereof.

2. The combination with the cutter bar of a mowing machine, of a grass divider therefor carried by the outer end thereof including a minor and major section, means for rigidly securing the minor section to the outer end of the cutter bar, a hinge including a pair of hinged leaves, means rigidly connecting one leaf of the minor section, and means for detachably connecting the other leaf to the major section and preventing movement of the leaf out of engagement with the major section under normal conditions.

3. The combination with a mowing machine including a cutter bar, of a grass divider for the cutter bar including a minor and a major section, means rigidly securing the minor section to the cutter bar, a hinge including a pair of leaves, means rigidly securing one leaf to the inner face of the minor section, means slidably and detachably connecting the other leaf to the inner face of the major section, means for preventing the normal disengagement of the last mentioned leaf from the major section, and fulcrum shoulders carried by the outer faces of the major and minor sections for permitting the swinging and pulling out of the last mentioned leaf to release the major section from the minor section when undue stress is placed upon the inner face of the major section.

4. A grass divider for mowing machines comprising a minor section and a major section, of a hinge for hingedly connecting the sections together including a relatively long leaf rigidly secured to the inner face of the minor section, a relatively small leaf, a pair of spaced guide lugs carried by the inner face of the major section, a cover plate slidably and resiliently carried by the major section and normally maintained into frictional engagement with the guide lugs and defining therewith a guide way for said relatively short hinge leaf, an abutment lug disposed in the guideway, the relatively short hinge leaf being provided with an opening arranged to receive said abutment, the sliding cover plate normally maintaining the relatively short leaf in position for engaging said abutment lug.

5. A grass divider for mowing machines comprising a minor section and a major section, of a hinge for hingedly connecting the sections together including a relatively long leaf rigidly secured to the inner face of the minor section, a relatively small leaf pivotally connected to the long leaf, a pair of spaced guide lugs carried by the inner face of the major section, a cover plate slidably and resiliently carried by the major section and normally maintained in frictional engagement with the guide lugs and defining therewith a guide way for said relatively short hinge leaf, an abutment lug disposed in the guideway, the relatively short hinge leaf being provided with an opening arranged to receive said abutment lug, the sliding cover plate normally maintaining the relatively short leaf in position for engaging said abutment lug, and fulcrum shoulders secured to the faces of the major and minor sections opposite to the faces carrying said hinge.

6. A grass divider for mowing machines comprising a minor section, a major section, a hinge including a relatively long leaf rigidly secured to the minor section, and a relatively short leaf hingedly connected thereto, a faceplate secured to the major section, a pair of guide lugs secured to the base plate, a cover plate disposed over the guide lugs, resilient means for normally maintaining the cover plate in engagement with the guide lugs, the cover plate being adapted to be forced outwardly when undue pressure is placed upon the same, the cover plate and the base plate being provided with registering openings, the relatively short leaf being adapted to be positioned between the guide lugs, the cover plate and the face plate, the relatively short leaf having openings therein adapted to register with the openings in the cover and face lugs, and frangible pins fitted in said openings.

CORAL H. WRIGHT.